(12) United States Patent
Delmer

(10) Patent No.: US 6,561,443 B2
(45) Date of Patent: May 13, 2003

(54) DRIP IRRIGATION TAPE

(75) Inventor: Daniel W. C. Delmer, Huntington Beach, CA (US)

(73) Assignee: Valplastic U.S.A., LLC, Huntington Beach, CA (US)

( * ) Notice: Subject to any disclaimer, the term of this patent is extended or adjusted under 35 U.S.C. 154(b) by 0 days.

(21) Appl. No.: 09/970,061

(22) Filed: Oct. 3, 2001

(65) Prior Publication Data

US 2002/0074434 A1 Jun. 20, 2002

Related U.S. Application Data

(60) Provisional application No. 60/237,939, filed on Oct. 3, 2000.

(51) Int. Cl.⁷ .............................................. B05B 15/00
(52) U.S. Cl. ........................................ 239/542; 239/547
(58) Field of Search ................................ 239/542, 547, 239/195

(56) References Cited

U.S. PATENT DOCUMENTS

| 4,047,995 A | 9/1977 | Diaz |
| 4,247,051 A | 1/1981 | Allport |
| 4,548,360 A | 10/1985 | Delmer et al. |
| 4,642,152 A | 2/1987 | Chapin |
| 4,984,739 A | 1/1991 | Allport |
| 5,246,171 A | 9/1993 | Roberts |
| 5,252,162 A | 10/1993 | Delmer |
| 5,333,793 A | * 8/1994 | DeFrank .................. 239/533.1 |
| 5,695,127 A | 12/1997 | Delmer et al. |
| 5,732,887 A | 3/1998 | Roberts |
| 5,855,324 A | 1/1999 | DeFrank et al. |
| 5,957,391 A | 9/1999 | DeFrank et al. |
| 6,308,902 B1 | 10/2001 | Huntley |

* cited by examiner

Primary Examiner—Michael Mar
Assistant Examiner—Christopher Kim
(74) Attorney, Agent, or Firm—Stetina Brunda Garred & Brucker

(57) ABSTRACT

A drip irrigation hose includes a hose body formed of a single sheet of overlapping material. The hose includes a primary fluid chamber extending longitudinally along the hose formed within the hose body. The hose includes a plurality of secondary fluid chambers serially disposed along the hose. The secondary fluid chambers each include a plurality of inlets formed in the hose body between a first portion and the primary fluid chamber for receiving fluid from the primary fluid chamber. The secondary fluid chambers each includes a second portion including a plurality of embossed regions formed in the hose body, and an outlet formed in the hose body adjacent the second end. Each of the secondary fluid chambers includes a pair of ribs longitudinally disposed along the first and second portions for forming side walls of each of the secondary fluid chambers.

9 Claims, 3 Drawing Sheets

DRIP IRRIGATION TAPE

CROSS-REFERENCE TO RELATED APPLICATIONS

This application claims priority to provisional application, Ser. No. 60/237,939, filed on Oct. 3, 2000, the contents of which are incorporated herein by reference.

STATEMENT RE: FEDERALLY SPONSORED RESEARCH/DEVELOPMENT (Not Applicable)

BACKGROUND OF THE INVENTION

The present invention relates generally to agricultural irrigation. More particularly, the present invention relates to a tubular flexible hose, or tape, which is used to distribute water substantially uniformly at discreet locations spaced along its length. Such "tape" hoses are creased longitudinally so that when they are not filled with water under pressure they collapse to a flat tape-like configuration. Such tapes are more easily rolled, transposed, and stored than are hoses which remain always round in cross section. Consequently, the present invention relates to hose structure of the type generally recognized as "drip irrigation tape". An example of a prior art drip irrigation tape is disclosed in U.S. Pat. No. 5,695,127 to Delmer et al. Such drip irrigation tapes are widely used in row-crop farming so that irrigation water is distributed to the soil immediately adjacent to the growing plants, and the entire field need not be irrigated. The use of such irrigation tapes results in considerable reduction in water use, loss of fertilizer, and accumulation of mineral sales in arable agricultural soils.

It is contemplated that there exists a need in the art for an improved tape type drip irrigation hose in comparison to the prior art designs.

BRIEF SUMMARY OF THE INVENTION

In accordance with an aspect of the present invention, there is provided a drip irrigation hose. The hose includes a hose body formed of a single sheet of overlapping material. The hose includes a primary fluid chamber extending longitudinally along the hose formed within the hose body. The hose includes a plurality of secondary fluid chambers serially disposed along the hose. Each of the secondary fluid chambers includes a first portion in fluid communication with the primary fluid chamber. The first portion includes a plurality of inlets formed in the hose body between the first portion and the primary fluid chamber for receiving fluid from the primary fluid chamber to the first portion. Each of the secondary fluid chambers includes a second portion including a first end and a second end, the first end in fluid communication with the first portion, a plurality of embossed regions formed in the hose body, and an outlet formed in the hose body adjacent the second end. Each of the secondary fluid chambers includes a pair of ribs longitudinally disposed along the first and second portions for forming side walls of each of the secondary fluid chambers. Each of the secondary fluid chambers includes fluid path from the primary fluid chamber through the inlets, through the first portion, through the second portion about the plurality of embossed regions, and through the outlet.

According to an embodiment of the present invention, the embossed regions are formed in the shape of opposing intermeshed teeth. The embossed regions are formed between respective pairs of the ribs. The ribs are formed in channels formed in the hose body by folds in the sheet of material longitudinally disposed along the first and second portions. The ribs are formed of strips of glue. The ribs are in direct communication with the fluid path. Each pair of ribs of the secondary fluid chambers are contiguously formed with adjacent pairs of ribs of the secondary fluid chambers. The hose may further include a plurality of overlapping sealed portions disposed between adjacent ones of the secondary fluid chambers for preventing fluid flow from a second end of a second portion of a respective one of the secondary fluid chambers from communicating with a first portion of an adjacent secondary fluid chamber. The overlapping sealed portions extend laterally between ribs of adjacent secondary fluid chambers.

Accordingly, the present invention represents a significant advance in the art.

BRIEF DESCRIPTION OF THE DRAWINGS

These, as well as other features of the present invention, will become more apparent upon reference to the drawings wherein.

DETAILED DESCRIPTION OF THE INVENTION

Figure 1:
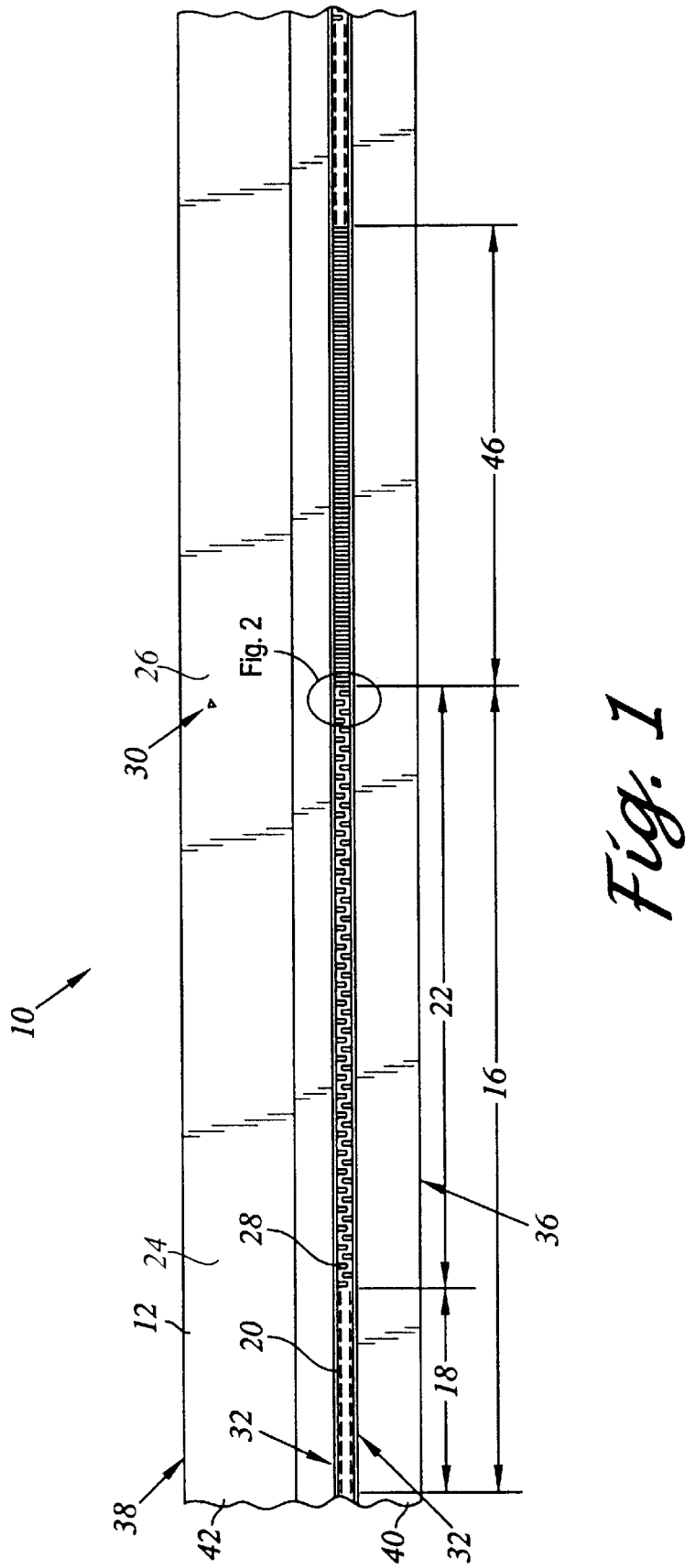
FIG. 1 is a top plan view of a segment of a drip irrigation hose of the present invention in a pre-constructed flat sheet configuration.

Referring now to the drawings wherein the showings are for purposes of illustrating a preferred embodiment of the present invention only, and not for purposes of limiting the same, FIGS. 1–8 illustrate a drip irrigation hose according to aspects of the present invention.

Figure 6:
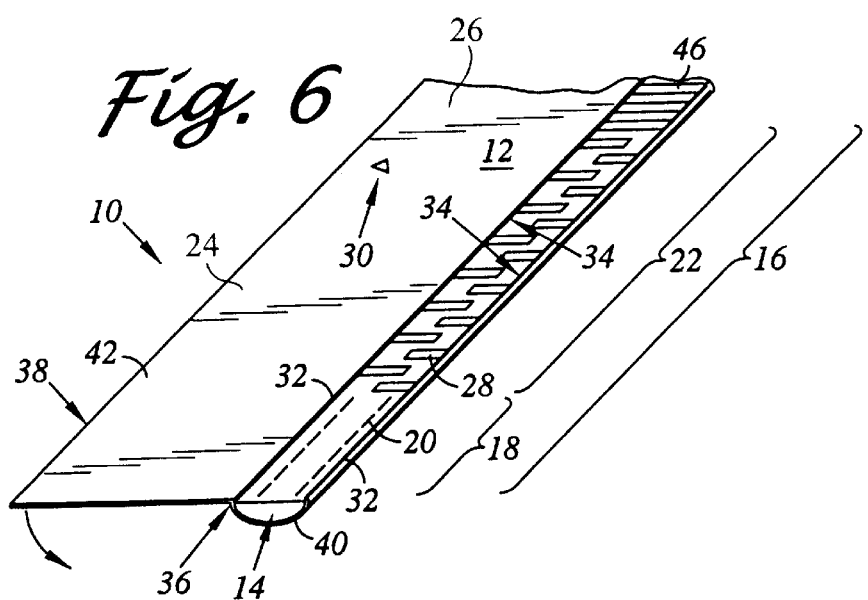
FIG. 6 is a perspective view of a portion of the drip irrigation hose of FIG. 1 shown with a first flap in a folded configuration for forming a primary fluid chamber.
Figure 7:
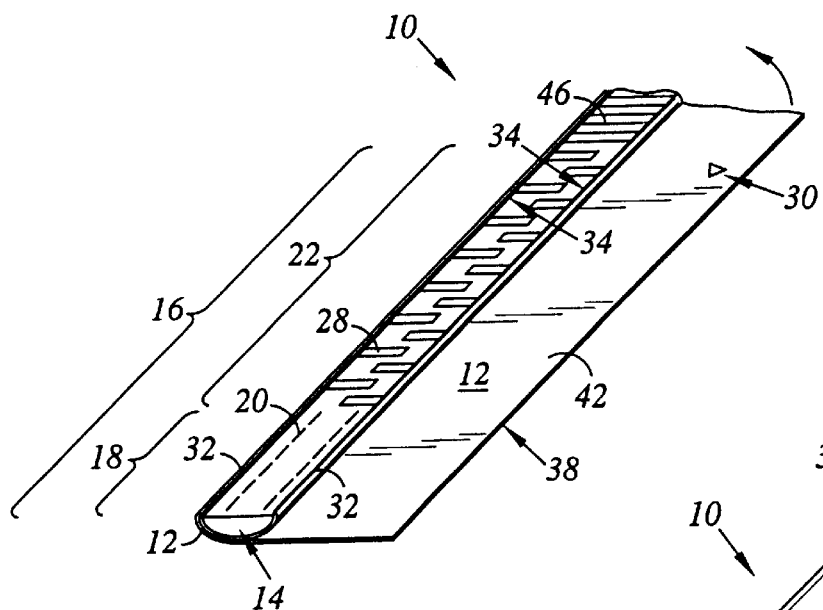
FIG. 7 is a perspective view of the portion of the drip irrigation hose of FIG. 6 shown with a second flap in a folded configuration for sealing the primary fluid chamber.
Figure 8:
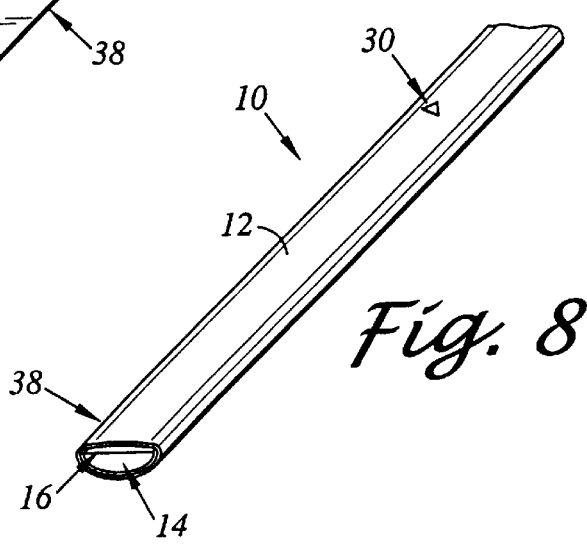
FIG. 8 is a perspective view of the portion of the drip irrigation hose of FIG. 7 shown with a second flap in a further folded configuration for forming the secondary fluid chambers.

In accordance with an aspect of the present invention, there is provided a drip irrigation hose 10, as shown in its operable configuration in FIG. 8. The hose 10 is shown in a pre-constructed flat sheet configuration in FIG. 1. The hose 10 includes a hose body 12 formed of a single sheet of overlapping material. The hose 10 includes a primary fluid chamber 14 extending longitudinally along the hose 10 formed within the hose body 12, as seen in FIGS. 6–8. The hose 10 includes a plurality of secondary fluid chambers 16 serially disposed along the hose 10. The longitudinal regions forming the secondary fluid chamber 16 is indicated in FIG. 1 depicting the hose 10 a pre-constructed flat sheet configuration in FIG. 1.

Figure 2:
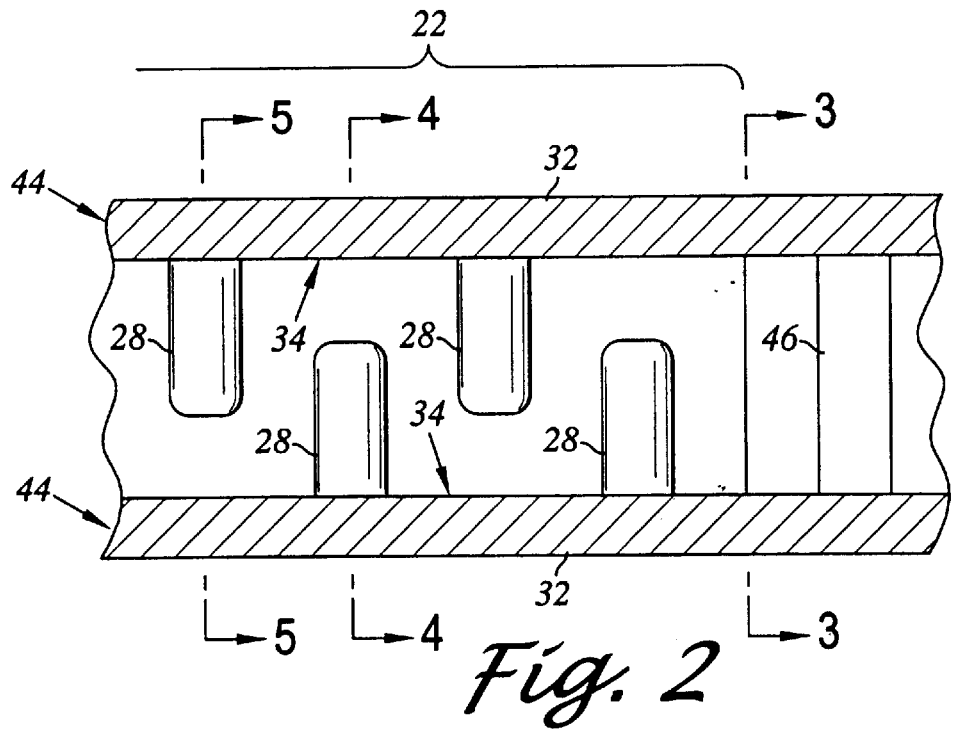
FIG. 2 is an enlarged view of a portion of the drip irrigation hose of FIG. 1 depicting a plurality of embossed regions of a secondary fluid chamber.

Each of the secondary fluid chambers 16 includes a first portion 18 in fluid communication with the primary fluid chamber 14. The first portion 18 includes a plurality of inlets 20 formed in the hose body 12 between the first portion 18 and the primary fluid chamber 14 for receiving fluid from the primary fluid chamber 14 to the first portion 18. The longitudinal regions forming the first portion 18 is indicated in FIG. 1 depicting the hose 10 a pre-constructed flat sheet configuration. Each of the secondary fluid chambers 16 further includes a second portion 22. The longitudinal regions forming the second portion 22 is indicated in FIG. 1 depicting the hose 10 a pre-constructed flat sheet configuration. Each second portion 22 includes a first end 24 and a second end 26 with the first end 24 in fluid communication with the first portion 18. Each second portion 22 further includes a plurality of embossed regions 28 formed in the hose body 12. As shown in FIGS. 1–2 in top plan views, and in FIGS. 3–5 in various cross sectional views. It is contemplated that embossed regions 28 creates a fluid flow obstacles for regulate fluid flow through the secondary fluid chambers 16.

Each second portion 22 further includes an outlet 30 formed in the hose body 12 adjacent the second end 26. Each of the secondary fluid chambers 16 further includes a pair of ribs 32 longitudinally disposed along the first and second portions 18, 22 for forming side walls 34 of each of the secondary fluid chambers 16. Each of the secondary fluid chambers 16 further includes fluid path from the primary fluid chamber 14 through the inlets 20, through the first portion 18, through the second portion 22 about the plurality of embossed regions 28, and through the outlet 30.

As mentioned above, the hose 10 is formed of a hose body 12 which is formed of a single sheet of overlapping material. Such sheet of material is not necessarily flat, however, as the hose body 12 includes the embossed regions 28 and various other surface features discussed below. Nonetheless, the hose body 12 in the pre-folded configuration is generally planar in nature. Suitable material selections of the hose body are disclosed in U.S. Pat. No. 5,695,127 to Delmer et al., incorporated herein by reference.

The overlapping nature of the hose body 12 may be further understood with reference to a sequential folding description of an embodiment of the hose 10 of the present invention. Referring now to FIG. 1 there is depicted a top plan view of a segment of a drip irrigation hose 10 of the present invention in a pre-constructed flat sheet configuration. The hose body 12 may have first and second marginal edges 36, 38. A longitudinally disposed first flap 40 may laterally extend between the first marginal edge 36 and the adjacentmost one of the pair of ribs 34. A longitudinally disposed second flap 42 may laterally extend between the second marginal edge 38 and the remaining one of the pair of ribs 34.

Referring now to FIG. 6, there is depicted a perspective view of a portion of the hose 10 of FIG. 1 shown with the first flap 40 in a folded configuration for forming the primary fluid chamber 14. In this regard, first flap 40 is folded back onto the hose body 12 with the first marginal edge 36 contacting the hose body 12. The first marginal edge 36 may be sealingly engaged with the hose body 12. Thus, the loop formed by the first flap 40 formed a longitudinally disposed primary fluid chamber 14 which extends a length of the hose 10. During use, fluid is introduced at one end of the hose 10 into the primary fluid chamber 14.

Referring now to FIG. 7, there is depicted the hose 10 of FIG. 6, however, as shown with the second flap 42 in a folded configuration for further sealing the primary fluid chamber 14. Next, as seen in FIG. 8, the second flap 42 may be further folded back with the second marginal edge 38 sealingly engaged with the hose body 12 for forming the secondary fluid chambers 16. This further places the hose 10 in its final folded configuration.

The first portion 18 includes a plurality of inlets 20 formed in the hose body 12 between the first portion 18 and the primary fluid chamber 14 for receiving fluid from the primary fluid chamber 14 to the first portion 18. In this regard, the inlets 20 may take the formed of longitudinal slits formed in the hose body 12. Pressurized fluid within the primary fluid chamber 14 may pass through the slits into the first portion 18 of the secondary fluid chambers 16.

Figure 3:
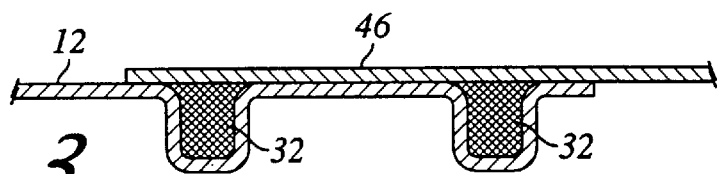
FIG. 3 is a cross sectional view a secondary fluid chamber of the drip irrigation in an operable configuration as seen along an axis 3—3 of FIG. 2.
Figure 4:
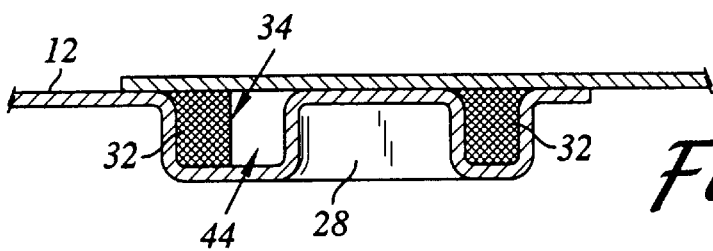
FIG. 4 is a cross sectional view a secondary fluid chamber of the drip irrigation in an operable configuration as seen along an axis 4—4 of FIG. 2.
Figure 5:
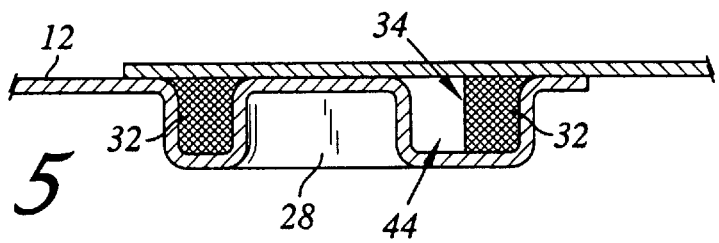
FIG. 5 is a cross sectional view a secondary fluid chamber of the drip irrigation in an operable configuration as seen along an axis 5—5 of FIG. 2.

The first portion 18 terminates at the first end 24 of the second portion 22. In this regard, fluid introduced into the first portion 18 follows the fluid path to the first end 24. Each second portion 22 includes the plurality of embossed regions 28 formed in the hose body 12. Referring to FIGS. 3–5, there is depicted various cross sectional views of the embossed regions 28 as seen along axis 3—3, 4—4 and 5—5 of the enlarged plan view of a portion of the secondary fluid chamber 22 in FIG. 2.

According to an embodiment of the present invention, the embossed regions 28 are formed in the shape of opposing intermeshed teeth. In this regard, the fluid path may take a serpentine configuration about the various adjacent embossed regions 28. Such tortuous path extends through the second portion 22 to the second end 26. At the second end 26, the fluid path continues out of the secondary fluid chamber 16 (and out of the hose 10) through the outlet 30. It is contemplated that such tortuous path about the embossed regions 28 tends to relatively regulate fluid flow with in the various ones of the secondary fluid chambers 16.

Each pair of ribs 32 is longitudinally disposed along the first and second portions 18, 22 for forming side walls 34 of each of the secondary fluid chambers 16. In particular, the ribs 34 may be formed in channels 44 formed in the hose body 12 by folds in the sheet of material longitudinally disposed along the first and second portions 18, 22. The ribs 32 may be formed of strips of glue disposed within the channels 44. Ribs 32 may partially fill the channels 44 in a lateral direction such as seen the cross sectional views of FIGS. 4 and 5. In this regard, the ribs 32 are in direct communication with the fluid path as the ribs 32 form the side walls 34 of the secondary fluid chambers 16. The embossed regions 28 may be formed between respective pairs of the ribs 32. In particular, the embossed regions 28 may form a portion of the channels 44 with the glue forming the ribs 32 being immediately disposed on an opposite side of the hose body 12. Additionally, each pair of ribs 32 of the secondary fluid chambers 16 may be contiguously formed with adjacent pairs of ribs 32 of the secondary fluid chambers 16. As such, a single pair of ribs 32 may be formed along the length of the hose body 12.

As indicated in FIG. 1, the hose 10 may further include a plurality of overlapping sealed portions 46 disposed between adjacent ones of the secondary fluid chambers 16 for preventing fluid flow from the second end 26 of the second portion 22 of respective ones of the secondary fluid chambers 16 from communicating with the first portion 18 of an adjacent secondary fluid chamber 16. The overlapping sealed portions 46 extend laterally between ribs 32 of adjacent secondary fluid chambers 16. The overlapping sealed portions 46 may be utilized to space apart at desired intervals successive ones of the secondary fluid chambers 16, and therefore the outlets 30.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A drip irrigation hose comprising:

a hose body formed of a single sheet of single overlapping material;

a primary fluid chamber extending longitudinally along the hose formed within the hose body; and a plurality of secondary fluid chambers serially disposed along the hose, each of the secondary fluid chambers including;

a first portion in fluid communication with the primary fluid chamber, the first portion including a plurality of inlets formed in the hose body between the first portion and the primary fluid chamber for receiving fluid from the primary fluid chamber to the first portion;

a second portion including:

a first end and a second end, the first end in fluid communication with the first portion;

a plurality of embossed regions formed in the hose body; and an outlet formed in the hose body adjacent the second end; and a pair of ribs longitudinally disposed along the first and second portions for forming side walls of each of the secondary fluid chambers; and a fluid path from the primary fluid chamber through the inlets, through the first portion, through the second portion about the plurality of embossed regions, and through the outlet.

2. The hose of claim 1 wherein the embossed regions are formed in the shape of opposing intermeshed teeth.

3. The hose of claim 1 wherein the embossed regions are formed between respective pairs of the ribs.

4. The hose of claim 1 wherein the ribs are formed in channels formed in the hose body by folds in the sheet of material longitudinally disposed along the first and second portions.

5. The hose of claim 1 wherein the ribs are formed of strips of glue.

6. The hose of claim 1 wherein portions of the ribs are in direct communication with the fluid path.

7. The hose of claim 1 wherein each pair of ribs of the secondary fluid chambers are contiguously formed with adjacent pairs of ribs of the secondary fluid chambers.

8. The hose of claim 1 further comprising a plurality of overlapping sealed portions disposed between adjacent ones of the secondary fluid chambers for preventing fluid flow from a second end of a second portion of a respective one of the secondary fluid chambers from communicating with a first portion of an adjacent secondary fluid chamber.

9. The hose of claim 8 wherein the overlapping sealed portions extend laterally between ribs of adjacent secondary fluid chambers.

* * * * *